No. 675,853. Patented June 4, 1901.
B. EDGAR.
FISH HOOK.
(Application filed Sept. 26, 1900.)
(No Model.)

Witnesses
J. G. Hinkel
C. W. Clement

Inventor
Butler Edgar
By Watson & Watson
Attorneys

THE NORRIS PETERS CO., PHOTO-LITHO., WASHINGTON, D. C.

UNITED STATES PATENT OFFICE.

BUTLER EDGAR, OF DANVILLE, PENNSYLVANIA, ASSIGNOR TO THOMAS B. MILLS, OF BOROUGH OF BROOKLYN, NEW YORK, N. Y.

FISH-HOOK.

SPECIFICATION forming part of Letters Patent No. 675,853, dated June 4, 1901.

Application filed September 26, 1900. Serial No. 31,169. (No model.)

*To all whom it may concern:*

Be it known that I, BUTLER EDGAR, a citizen of the United States, residing at Danville, in the county of Montour, State of Pennsylvania, have invented certain new and useful Improvements in Fish-Hooks, of which the following is a specification.

The object of the present invention is to provide a fish-hook of simple and inexpensive construction from which the bait cannot become accidentally dislodged and which will securely hold the fish when it has taken the bait or become engaged with the hook.

The invention comprises various improvements upon the fish-hook patented to me October 30, 1877, by United States Letters Patent No. 196,648.

The invention will be fully described hereinafter, reference being had to the accompanying drawings, in which—

Figure 1:
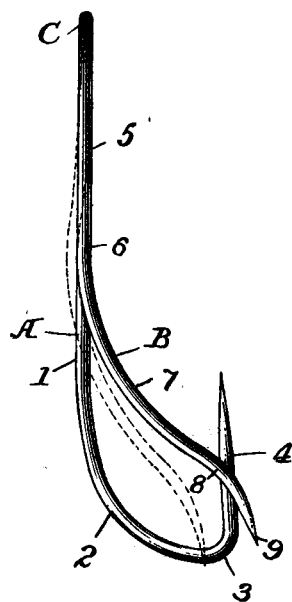
Figure 2:
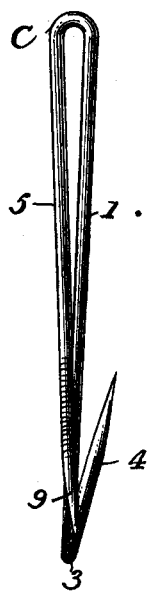
Figure 3:
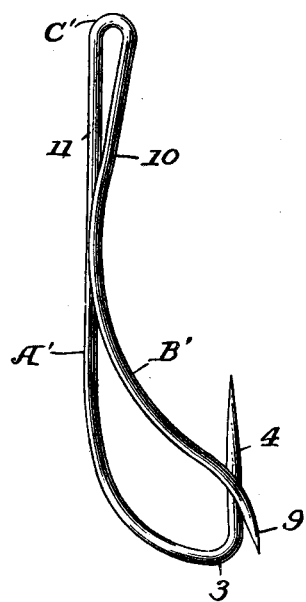
Figure 4:
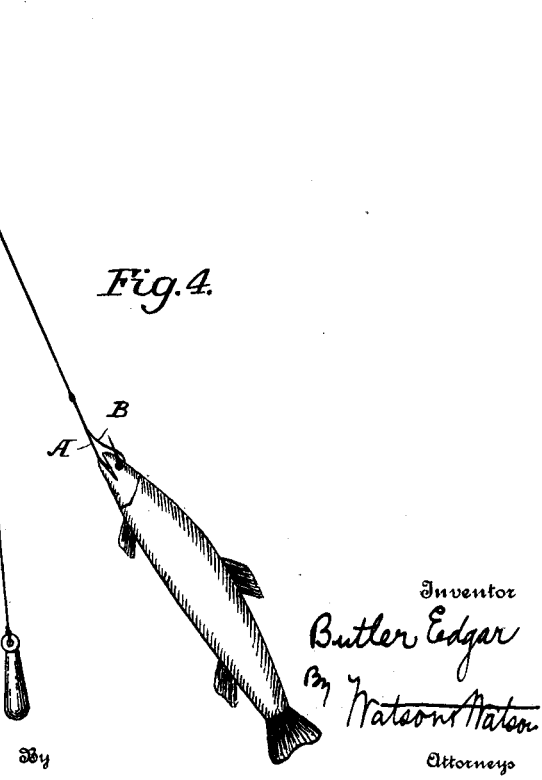

Figure 1 is a side view of a fish-hook constructed according to my invention. Fig. 2 is an edge view of the same. Fig. 3 is a side view of a modified form, and Fig. 4 is a perspective view showing the hook in operation.

Referring to Figs. 1 and 2, which show the preferred form of the invention, it will be seen that this improved fish-hook is formed of a single piece of wire tapered and sharpened at both ends, no barb be required. The device may be described as consisting of a hook A and a guard B, united by a sharp bend C, which forms the eye to receive the line. The hook proper, A, preferably has a straight shank 1, a curved back 2, a rather abrupt bend at the lower end 3, and a straight pointed return portion 4, which is preferably turned to one side, as shown in Fig. 2. The parts 2, 3, and 4 form the hook proper. The hook just described is substantially the same as the corresponding portion of my patented fish-hook.

The chief feature of the present invention is the construction and arrangement of the part B, which forms a guard to hold the bait and the fish upon the hook and serves other purposes, which will be presently mentioned. The loop or curve C is in a plane nearly at right angles with the plane of the hook A, as shown in Figs. 1 and 2. The guard has a straight shank 5 extending nearly parallel with the hook-shank 1 to a point 6 near the middle of the device. From the point 6 the guard B follows a slight curve 7 until it reaches the straight portion or spear 4 of the hook, which it crosses. Approximately at the point of intersection 8 the curve of the guard is reversed, and it terminates in a downward point 9 in front of and close to one side of the spear 4. The point 9 is preferably so low that when the guard is thrown down into the position shown in dotted lines in Fig. 1 the point will still be in contact with the hook.

In the patent referred to the loop C is shown in the plane of the hook and guard, and when a strain was placed upon the hook sufficient to bend it slightly the guard would tend to rise relatively to the hook and throw off the fish. By arranging the loop C at right angles to the plane of the hook and guard a strain or weight upon the hook tends slightly to move the guard laterally away from the hook, which facilitates the engagement of the hook with the fish, but it does not tend to raise the guard and throw the fish off. On account of this defect in the patented fish-hook it was necessary to construct it of a heavier wire than is used in the improved hook, the heavy wire being used to prevent the eye from bending and the guard from throwing off the fish.

A further improvement in the present invention over the patented fish-hook is that the point of the guard extends across and in front of the spear portion of the hook. A fish once engaged by the spear cannot escape by movement in the direction of the line, as such movement would cause the guard-point 9 to pierce it and prevent its escape. In this respect the guard serves the purpose of a barb. The guard is sufficiently flexible to yield sidewise and permit the fish to drop into the hook under the guard, as shown in Fig. 4. It will be readily seen that a piece of bait can be held on the hook by the points 4 and 9 in such manner that it cannot move in either direction.

In Fig. 3 I have shown a modification in which the loop C' is in substantially the plane occupied by the guard B' and the hook A'. The shank 10 of the guard is bent backward, so that a portion of it lies above the shank 11 of the hook in order that the shank 11 will not obstruct the rearward movement of the guard. In other respects this fish-hook is identical with that shown in Figs. 1 and 2.

Having thus described my invention, what I claim, and desire to secure by Letters Patent, is—

1. As a new article of manufacture a fish-hook comprising a hook portion A and a guard B made of a single piece of metal bent sharply upon itself to form an eye C, the hook and guard having shank portions nearly parallel with each other, said hook having an upturned spear portion and said guard having a reversely-curved portion extending across the hook and provided with a downwardly-turned point adjacent to and in front of the spear.

2. As a new article of manufacture a fish-hook comprising a hook portion A provided with a shank and an upturned point; and a guard B having a shank and a reversely-curved portion extending across the hook, the shanks of the hook and guard being united by a bend C substantially at right angles to the plane of said hook and guard, and the point of the guard being in front of the point of the hook and directed oppositely thereto whereby it acts as a barb to retain objects on the hook.

In testimony whereof I affix my signature in presence of two witnesses.

BUTLER EDGAR.

Witnesses:
S. A. TERRY,
C. W. CLEMENT.